(12) United States Patent
Milliere

(10) Patent No.: US 6,981,676 B2
(45) Date of Patent: Jan. 3, 2006

(54) METHOD AND SPOILER SYSTEM FOR ENSURING THE AERODYNAMIC CONTINUITY OF THE UPPER SURFACE OF AN AIRCRAFT

(75) Inventor: Jérôme Milliere, Leguevin (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/945,101

(22) Filed: Sep. 21, 2004

(65) Prior Publication Data

US 2005/0061922 A1 Mar. 24, 2005

(30) Foreign Application Priority Data

Sep. 22, 2003 (FR) .................................. 03 11076

(51) Int. Cl.
*B64C 9/14* (2006.01)
(52) U.S. Cl. ....................... 244/213; 244/216; 244/218
(58) Field of Classification Search ......... 244/213–219
See application file for complete search history.

(56) References Cited

U.S. PATENT DOCUMENTS

| 1,736,300 | A | * | 11/1929 | Wilford | 244/218 |
|---|---|---|---|---|---|
| 2,041,688 | A | | 5/1936 | Barnhart | |
| 3,130,943 | A | * | 4/1964 | Berresheim et al. | 244/213 |
| 4,120,470 | A | * | 10/1978 | Whitener | 244/213 |
| 4,563,970 | A | * | 1/1986 | Walker | 114/102.22 |
| 4,575,027 | A | * | 3/1986 | Cronin | 244/75 R |
| 4,784,355 | A | * | 11/1988 | Brine | 244/213 |
| 5,127,605 | A | | 7/1992 | Atchison et al. | |
| 5,735,485 | A | | 4/1998 | Ciprian et al. | |

FOREIGN PATENT DOCUMENTS

GB 1349739 4/1974

OTHER PUBLICATIONS

Preliminary Search Report dated Mar. 29, 2004 with English translation.

* cited by examiner

*Primary Examiner*—Galen Barefoot
(74) *Attorney, Agent, or Firm*—Stevens, Davis, Miller & Mosher, LLP

(57) ABSTRACT

Method and spoiler system for ensuring the aerodynamic continuity of the upper surface of an aircraft wing.

According to the invention, the spoiler 7 has a chord (C) of adjustable length and means (16, 19, 20) are provided for acting on the length of said chord when said spoiler (7) is in the retracted position.

9 Claims, 4 Drawing Sheets

METHOD AND SPOILER SYSTEM FOR ENSURING THE AERODYNAMIC CONTINUITY OF THE UPPER SURFACE OF AN AIRCRAFT

The present invention relates to a method for ensuring the aerodynamic continuity of the upper surface of an aircraft wing by means of spoilers, and to a spoiler system for implementing the method.

It is known that aircraft comprise, on their wings, trailing edge flaps allowing them to increase the lift of said wings in certain flight phases. Such trailing edge flaps can assume:

- either a retracted position, in which they are in aerodynamic continuity with the upper surface and with the lower surface of the wing to which they are fitted and of which they form a part of the trailing edge;
- or one or other of several deployed positions, deflected with respect to said retracted position, causing a protrusion on the upper surface and a hollow on the lower surface of said wing.

Furthermore, it is usual for modern aircraft, in particular civil transport aircraft, to comprise in their wings movable spoilers, also known as "air brakes". Such spoilers constitute aerodynamic control surfaces and they are installed in the upper surface of the wings, generally behind the structural box section of the latter and in front of said trailing edge flaps on the upper surface of which their own trailing edges bear.

When subjected to the action of actuating means, for example hydraulic, electrical or mechanical jacks, said spoilers can assume:

- either a retracted position in which they are housed in the upper surface of the corresponding wing thereby ensuring the aerodynamic continuity of said upper surface;
- or one or other of several deployed positions, in which they protrude with respect to the upper surface of the corresponding wing by being inclined with respect to said upper surface.

Thus, in the retracted position, said spoilers are integrated into the aerodynamic profile of the upper surfaces of the wings of the aircraft. On the other hand, in each of the deployed positions—each one of which is associated with a specific function and is defined by a value of angle of inclination with respect to the corresponding upper surface—said spoilers give rise to a reduction in lift and an increase in drag, whose amplitudes depend on said angle of inclination and on the area of said spoilers, and can be used for various purposes such as:

- reduction of the speed of the aircraft during the landing and possible abortion of takeoff phases;
- reduction of the speed of the aircraft in flight or increase in the descent gradient of said aircraft;
- pressing the aircraft onto the ground in order to improve braking during the landing or abortion of takeoff phases;
- in-flight control of the roll of the aircraft by acting in an asymmetric manner on the spoilers of the two wings;
- generation of a yawing moment by asymmetric action on the spoilers of the two wings participating in countering the effects of an engine failure during takeoff; or
- assisting in the reduction of the wing/fuselage end-fixing moment under heavy load factors (maneuvers, gusts of wind) by modifying the distribution of lift along the wings.

As mentioned above, the trailing edge of the spoilers bears on the trailing edge flaps in such a way that, when the spoilers are in the retracted position and the trailing edge flaps are in the retracted position, aerodynamic continuity between them is ensured.

However, when a trailing edge flap assumes a deployed position, whilst the corresponding spoiler is in the retracted position, an aerodynamic discontinuity appears between the spoiler and the trailing edge flap which is prejudicial to the functioning of the latter.

The purpose of the present invention is to overcome this disadvantage.

For this purpose, according to the invention, the method for ensuring the aerodynamic continuity of the upper surface of an aircraft wing between a spoiler in the retracted position and a trailing edge flap in the deployed position, the disposition of said spoiler and of said trailing edge flap being such that the trailing edge of said spoiler in the retracted position bears on said trailing edge flap in the retracted position, is noteworthy in that, when said trailing edge flap is in the deployed position whilst said spoiler is in the retracted position, the length of said spoiler is increased in a direction parallel with its chord in such a way that the trailing edge of said spoiler advances toward said trailing edge flap and comes to bear on the upper surface of the latter, in order to compensate for the break in aerodynamic continuity caused by the deployment of said trailing edge flap.

It will be noted that, in order to reduce the overall dimensions of the spoilers in the retracted position and the sizing of their deployment jacks, the patent GB-1 349 739 provides, on the one hand, for producing each of said spoilers in the form of several telescopically nested elements and, on the other hand, for varying the length of said telescopic spoilers in the direction parallel to their chord by the action of control means, between their retracted position and their deployed position and vice versa.

Thus, when it is inactive, in the retracted position, a spoiler exhibits a reduced area and reduced overall dimensions whereas, when it is active, in the deployed position, its area is increased until it assumes the value capable of allowing said spoiler to fully carry out its function.

In order to implement the method according to the present invention, it is advantageous to use a known spoiler system of this type, comprising:

- a spoiler having a variable length in the direction parallel to its chord and which is mobile between a retracted position and at least one deployed position;
- actuating means for causing said mobile spoiler to move from said retracted position to a deployed position and viceversa; and
- control means for varying said length of the spoiler, said spoiler system being noteworthy in that said control means are capable of varying said length of the spoiler when the latter is in the retracted position.

Said means of controlling the length of the chord of said spoiler and said actuating means for the deployment and retraction of the latter can be constituted by devices that are independent of each other, except for possibly being synchronized in their functioning. However, in a preferred embodiment, said means of controlling the length of said chord are constituted by said actuating means allowing the retraction and the deployment of said spoiler. In this case, said actuating means allowing the retraction and the deployment of said spoiler bear on said element of the latter capable of sliding in a direction parallel with said chord.

When, as mentioned above, said control means are constituted by said actuating means of the deployment and the retraction of the spoiler, locking means are provided capable of locking said spoiler in the retracted position during the action of said actuating means making it possible to vary the length of the chord of the latter.

In order to hold said telescopic elements of the spoiler together in the retracted position, there are advantageously provided elastic means pressing, against the rest of said spoiler, the element or elements of the spoiler that is capable of sliding in a direction parallel with said chord.

The figures of the appended drawing will give a good understanding of how the invention may be embodied. In these figures, identical references refer to similar elements.

Figure 1:
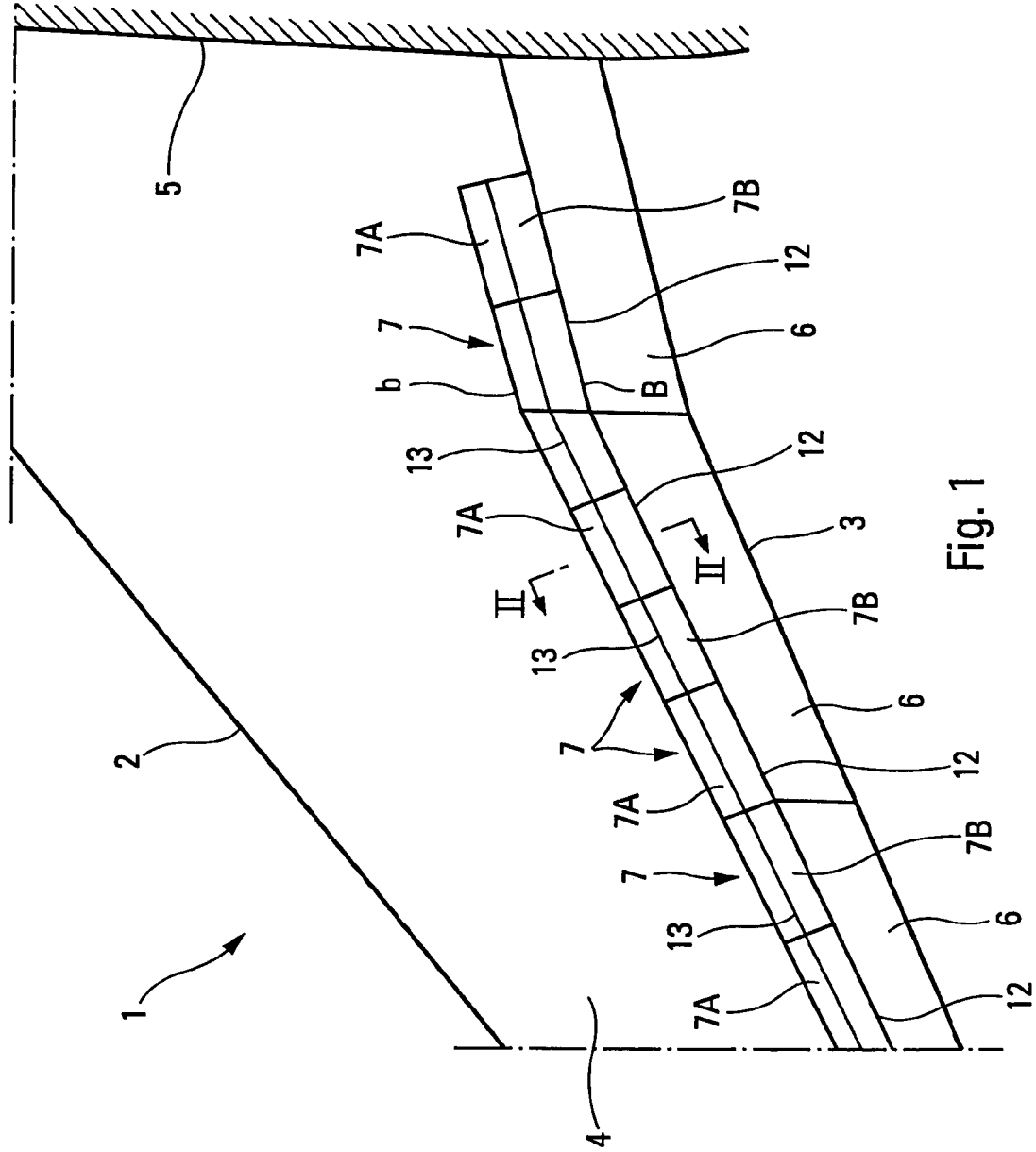
FIG. 1 shows, in a partial and diagrammatic plan view, an aircraft wing according to the present invention with both its spoilers and its trailing edge flaps in the retracted position.

The aircraft wing 1, shown partially and diagrammatically in plan view in FIG. 1, comprises a leading edge 2, a trailing edge 3, an upper surface 4 and a wing-root 5.

The trailing edge 3 of the wing 1 is formed by the juxtaposition of the trailing edges of a plurality of adjacent trailing edge flaps, 6.

In the upper surface 4, upstream of the trailing edge flaps 6 (with respect to the aerodynamic airflow over the wing 1), are disposed a plurality of spoilers 7.

Figure 2:
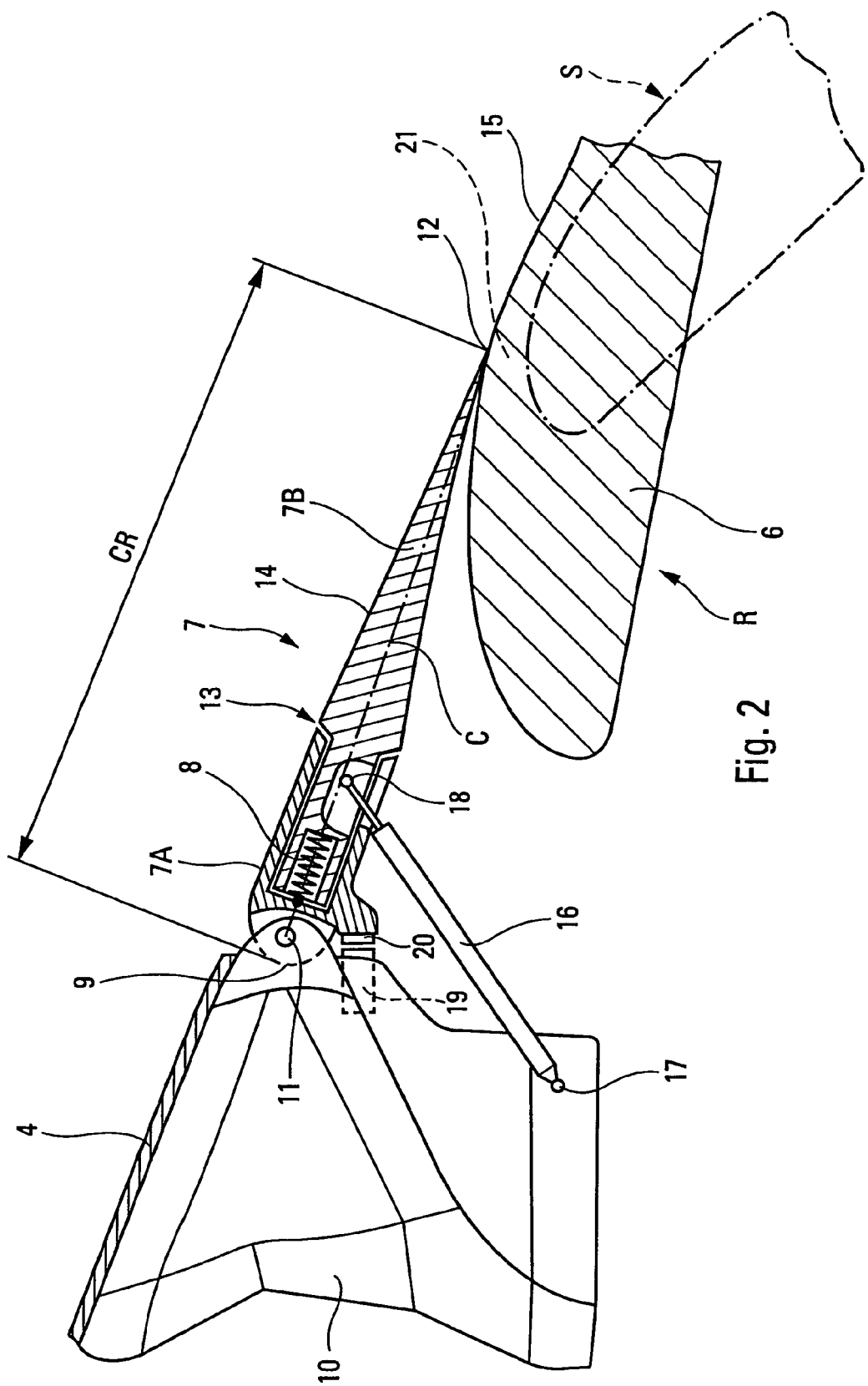
FIG. 2 is a diagrammatic, partial and enlarged, cross-sectional view through the line II—II of FIG. 1.

As shown in FIG. 2, each spoiler 7 comprises a leading edge part 7A and a trailing edge part 7B, the latter being nested in a telescopic manner in said leading edge part 7A in order to be able to slide with respect to the latter against the action of a spring 8 tending to press it against said part 7A.

Along its leading edge 9, the part 7A is articulated with the structure 10 of the wing 2 about an axis 11 parallel with said leading edge 9.

In the retracted position shown in FIGS. 1 and 2, the trailing edge 12 of the part 7B—which constitutes the trailing edge of the spoiler 7—bears on a trailing edge flap 6 in the retracted position R and the length CR of the chord C of the spoiler 7 is fixed by the action of the spring 8 pressing the part 7B against the part 7A. Between these parts 7A and 7B there is only a very narrow slit 13 and the upper surface 14 of the spoiler 7 provides aerodynamic continuity between the upper surface 4 of the wing 1 and the upper surface 15 of the flap 6.

Furthermore, the part 7B of the spoiler 7 is connected to the structure 10 of the wing 1 by an inclined strut constituted by a jack 16, whose ends 17 and 18 are articulated with said structure 10 and with said part 7B respectively.

In the retracted position of the spoiler 7 (FIGS. 1 and 2), the jack 16 applies a force to maintain the latter in the retracted position.

Figure 3:
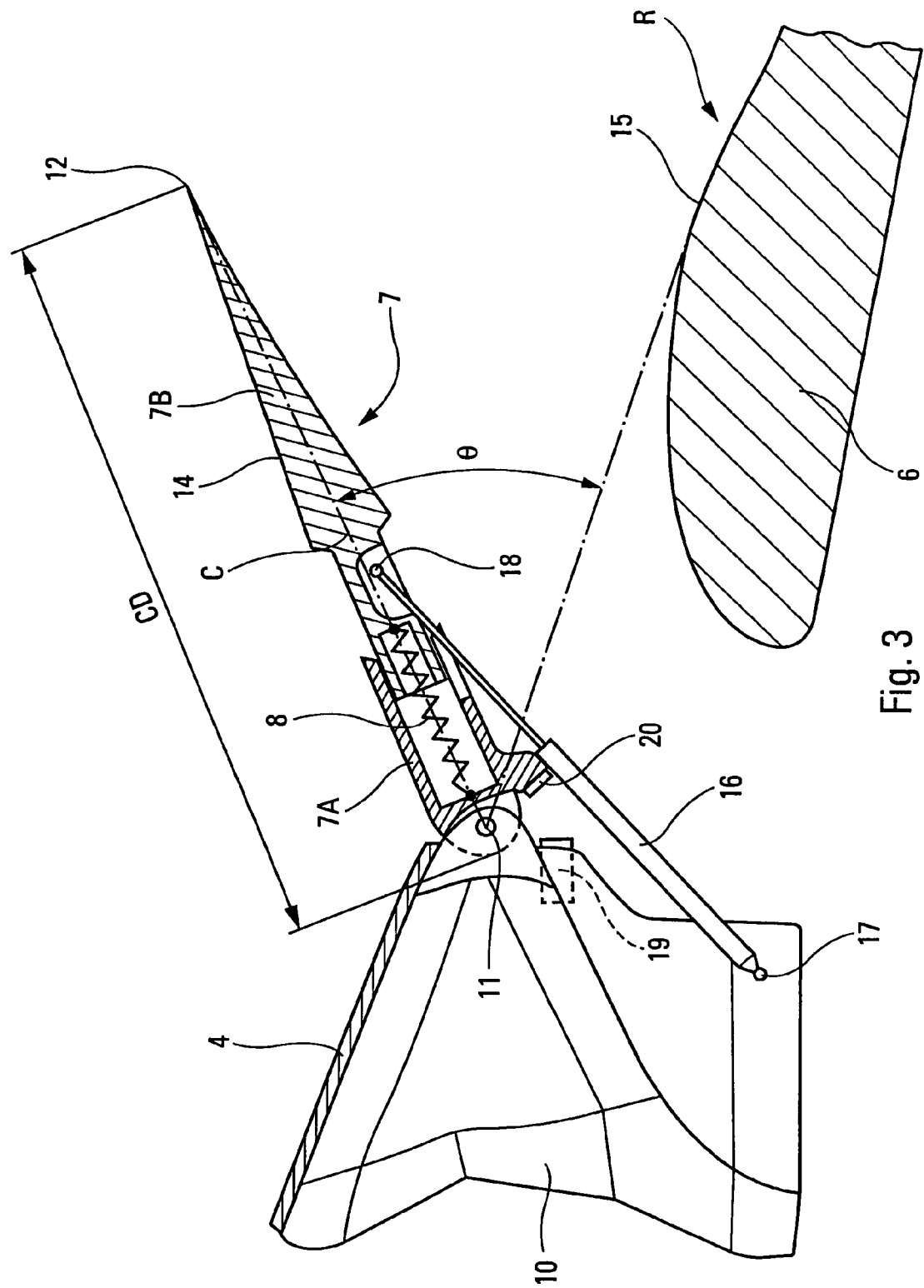
FIG. 3 shows, in a view similar to that of FIG. 2, the spoiler in a deployed position and the trailing edge flap in the retracted position.
Figure 4:
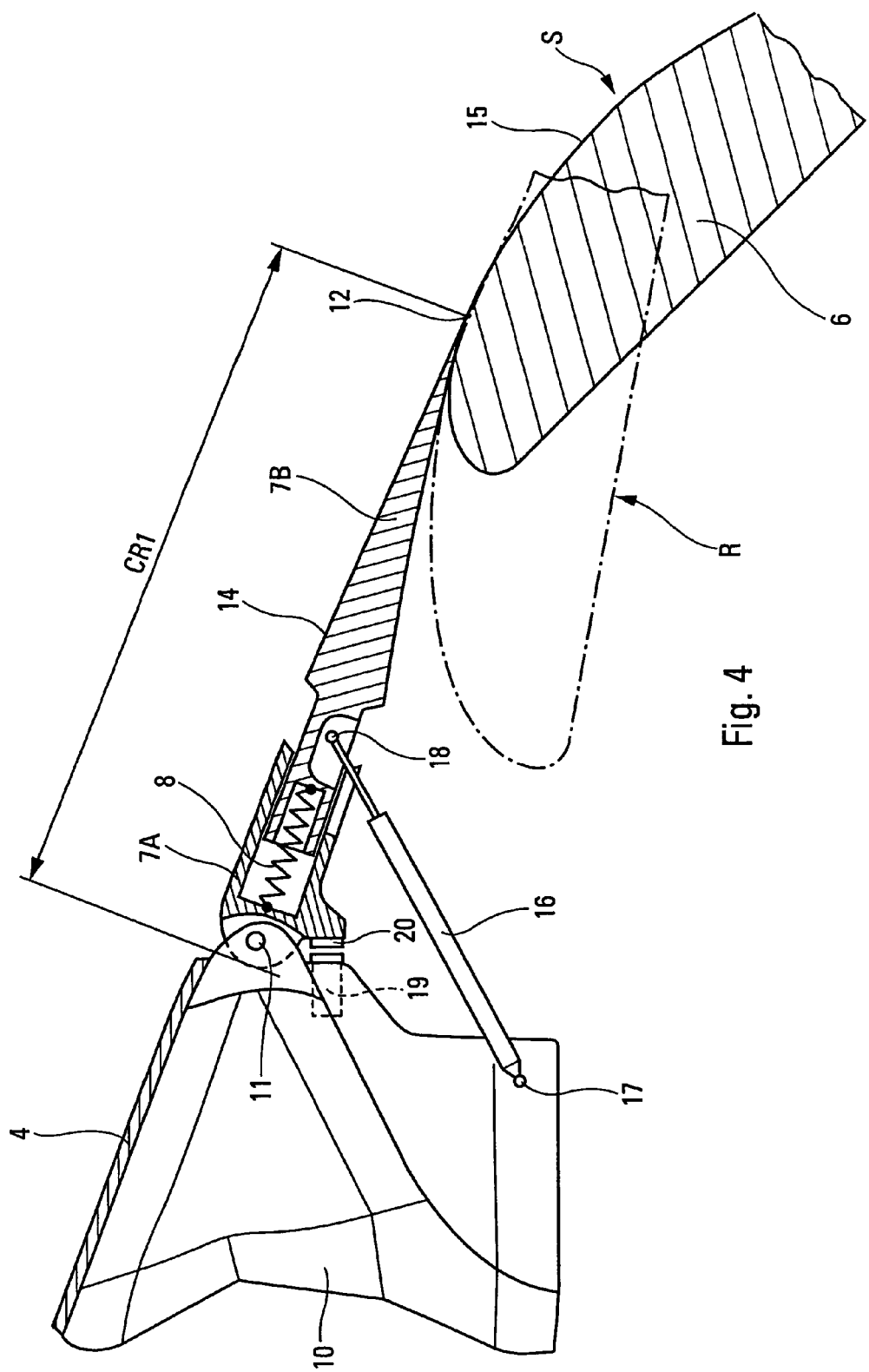
FIG. 4 illustrates, in a view similar to that of FIGS. 2 and 3, the extension of said spoiler in the retracted position, the trailing edge flap being in the deployed position.

Furthermore, the spoiler 7 can be locked in the retracted position by a controllable locking device preventing it from rotating. Such an antirotation locking device can be of numerous different types, for example mechanical, electrical or electromechanical. Preferably, as shown in FIGS. 2 to 4, an electromagnet 19 is used, for example mounted on the structure 10 and capable of cooperating with an armature 20, which is therefore mounted on the part 7A of the spoiler 7. The rotation locking force of the latter is therefore purely electromagnetic and can possibly be overcome in case of need.

When, with the locking device 19, 20 deactivated and the trailing edge flap in its retracted position R (see FIG. 3), the jack 16 is actuated, the length of the latter increases in such a way that, simultaneously and progressively, the spoiler 7 pivots about the axis 11 whilst becoming deployed and the length of its chord C increases against the action of the spring 8. As shown in FIG. 3, for a deployed position corresponding to an angle of rotation θ, the chord C assumes a value CD, greater than CR.

Even though only the one deployed position corresponding to a value of the angle θ has been shown in FIG. 3, it is of course obvious that the spoiler 7 can occupy, for other uses, one or more other deployed positions, corresponding to other values of that angle.

Furthermore, it must be noted that in the diagrammatic FIGS. 2 to 4 the sliding devices, such as linear ball bearing slides or similar, disposed between the two parts 7A and 7B, have not been shown for reasons of clarity.

As shown diagrammatically in FIG. 2, when, with the spoiler 7 in the retracted position, the trailing edge flap 6 moves from its retracted position R to a deployed position S, a slit 21 appears between the trailing edge 12 of the spoiler 7 and the upper surface 15 of the trailing edge flap 6, which creates aerodynamic disturbance on the upper surface 4 of the wing 2, since there is no longer aerodynamic continuity between the upper surface 14 of the spoiler 7 and the upper surface 15 of the trailing edge flap 6.

FIG. 4 shows in a diagrammatic manner how, according to the present invention, this disadvantage is overcome by using the extendable spoiler 7 to provide the aerodynamic continuity of the upper surfaces 4, 14 and 15 when the trailing edge flap 6 assumes a deployed position S.

For this purpose, the rotation of the spoiler 7 is locked by means of the actuation of the locking device 19 and 20 and, simultaneously, the jack 16 is actuated in order that it increases the length of the spoiler 7 in a direction parallel with its chord C until it reaches a value CR1 (greater than CR), in such a way that the trailing edge 12 of said spoiler 7 advances toward said trailing edge flap 6 and comes to bear on the upper surface 15 of the latter.

What is claimed is:

1. A method for ensuring aerodynamic continuity of an upper surface of an aircraft wing between a spoiler in a spoiler retracted position and a trailing edge flap in at least one flag deployed position, said spoiler being able to assume either (i) said spoiler retracted position in which said spoiler is housed in said upper surface thereby ensuring the aerodynamic continuity of said upper surface or (ii) at least one spoiler deployed position in which said spoiler protrudes with respect to said upper surface by being inclined with respect to said upper surface, said trailing edge flag being able to assume either (i) a flap retracted position in which said trailing edge flag is in aerodynamic continuity with said upper surface and with a lower surface of said wing of which said trailing edge flag forms a part of the trailing edge or (ii) said at least one flag deployed position, deflected with respect to retracted position, causing a protrusion on the upper surface and a hollow on the lower surface of said wing;

the disposition of said spoiler and of said trailing edge flap being such that the trailing edge of said spoiler in the spoiler retracted position bears on said trailing edge flap in the flap retracted position, wherein, when said trailing edge flap is in said at least one flag deployed position whilst said spoiler is in the spoiler retracted position, the length of said spoiler is increased in a direction parallel with its chord in such a way that the trailing edge of said spoiler advances toward said trailing edge flap and comes to bear on the upper surface of the latter, in order to compensate for the break in aerodynamic continuity caused by the deployment of said trailing edge flap.

2. A spoiler system for an aircraft wing, intended for the implementation of the method as claimed in claim 1 and comprising:
- a spoiler having a variable length in a direction parallel to its chord and which is mobile between a retracted position and at least one deployed position;
- actuating means for causing said mobile spoiler to move from said retracted position to a deployed position and vice versa; and
- control means for varying said length of said chord of said movable spoiler, wherein said control means vary said length of said spoiler when the latter is in the retracted position.

3. The spoiler system as claimed in claim 2, wherein said means of controlling the length of said chord comprise said actuating means allowing the retraction and the deployment of said spoiler.

4. The spoiler system as claimed in claim 3, further comprising locking means that lock said spoiler in the retracted position during the action of said actuating means making it possible to vary the length of the chord of the latter.

5. The spoiler system as claimed in claim 4, wherein said locking means apply an electromagnetic locking action.

6. The spoiler system as claimed in claim 3, wherein said spoiler comprises telescopically nested elements, at least one of said elements being capable of sliding in a direction parallel with the chord of said spoiler, wherein said actuating means allowing the retraction, the deployment and the control of said length of said spoiler bear on said at least one of said elements capable of sliding in a direction parallel with said chord.

7. The spoiler system as claimed in claim 2, wherein said actuating means are of the jack type.

8. The spoiler system as claimed in claim 6, further comprising elastic means tending to press, against the rest of said spoiler, the at least one of said elements capable of sliding in a direction parallel with said chord.

9. An aircraft comprising wings that comprise spoiler systems as claimed in claim 2.

* * * * *